(12) United States Patent
Unger et al.

(10) Patent No.: US 9,171,320 B2
(45) Date of Patent: Oct. 27, 2015

(54) RECOMMENDING LINK PLACEMENT OPPORTUNITIES

(71) Applicant: Marketo, Inc., San Mateo, CA (US)

(72) Inventors: Thomas R. Unger, Seattle, WA (US); Erez Barak, Kirkland, WA (US); Paul Robert Brown, Seattle, WA (US); Scott Fasser, San Mateo, CA (US)

(73) Assignee: Marketo, Inc., San Mateo, CA (US)

( * ) Notice: Subject to any disclaimer, the term of this patent is extended or adjusted under 35 U.S.C. 154(b) by 0 days.

(21) Appl. No.: 13/947,254

(22) Filed: Jul. 22, 2013

(65) Prior Publication Data
US 2014/0188608 A1 Jul. 3, 2014

Related U.S. Application Data

(63) Continuation of application No. 13/155,782, filed on Jun. 8, 2011, now abandoned.

(60) Provisional application No. 61/352,701, filed on Jun. 8, 2010.

(51) Int. Cl.
*G06F 17/30* (2006.01)
*G06Q 30/02* (2012.01)

(52) U.S. Cl.
CPC ...... *G06Q 30/0256* (2013.01); *G06F 17/30867* (2013.01)

(58) Field of Classification Search
CPC .................. G06F 17/30861; G06F 17/3089
USPC .................. 707/706, 723, 726; 705/14.4
See application file for complete search history.

(56) References Cited

U.S. PATENT DOCUMENTS

| 6,778,997 | B2 * | 8/2004 | Sundaresan et al. ... 707/999.003 |
| 7,240,055 | B2 * | 7/2007 | Grasso et al. .......... 707/999.005 |
| 7,257,766 | B1 * | 8/2007 | Koppel et al. ................. 715/205 |
| 8,145,592 | B2 * | 3/2012 | Liu et al. .......................... 706/62 |
| 2005/0210018 | A1 * | 9/2005 | Singh et al. ....................... 707/3 |

* cited by examiner

*Primary Examiner* — Khanh Pham
(74) *Attorney, Agent, or Firm* — Martine Penilla Group, LLP (57) ABSTRACT

Techniques for recommending Web pages or other content sources as candidates for link placement are described. Some embodiments provide a marketing activity support system ("MASS") configured to recommend candidate Web pages for link placement. Recommending candidate Web pages may include determining multiple Web pages that include or reference one or more keywords that describe some subject matter domain. Recommending candidate Web pages may then further include ranking or ordering at least some of the multiple Web pages based on how many times each of the at least some Web pages references another one of the multiple Web pages. The ordered Web pages may then be presented as recommended candidate sites for link placement.

21 Claims, 11 Drawing Sheets

RECOMMENDING LINK PLACEMENT OPPORTUNITIES

TECHNICAL FIELD

The present disclosure relates to techniques for facilitating marketing activities and, in particular, to methods, systems, and techniques for recommending web pages or other content sources relevant to a particular domain based upon link frequency.

DETAILED DESCRIPTION

Embodiments described herein provide enhanced computer- and network-based methods, systems, and techniques for supporting marketing activities. Example embodiments provide a marketing activity support system ("MASS") configured to recommend opportunities for link placement. Recommending opportunities for link placement includes determining Web pages and other content sources (e.g., messaging users/sites, such as online forum, blog, or microblog posters/users) that are relevant to a subject matter domain that is described by one or more sets of keywords. The subject matter domain may be one towards which a user (e.g., a marketing professional) of the MASS is directing a marketing campaign or other marketing activities. The determined Web pages can then be recommended by the MASS as candidates for the placement of a link or other reference to a target Web page or other network-accessible resource (e.g., Web page, online audio/video) that is directed to the subject matter domain.

In one embodiment, the recommended Web pages are determined based upon link frequency to other Web pages that are themselves highly ranked by one or more search engines for the subject matter domain specified by the provided keywords. Thus, the recommended Web pages may be useful locations for the placement of inbound links to a target Web page/site directed to a particular good or service that is in the subject matter domain. By adding to one or more of the recommended Web pages links pointing to the target Web page, the search engine rank for the target Web page may be organically increased.

In one example, a marketer may be seeking to promote a Web site that sells or otherwise traffics in a particular good or service. The marketer provides the MASS with one or more keywords or sets of keywords describing the good or service. In response, the MASS determines one or more Web pages for the provided keywords. Determining the Web pages may include first using one or more search engines to obtain a list of Web pages that are relevant to the provided keywords. Then, for each candidate Web page in the obtained list of Web pages, the MASS determines how many other Web pages from the obtained list are referenced by the candidate Web page. The MASS then orders or ranks the results based at least in part on the number of times each Web page in the list refers to other Web pages in the list, where pages that reference more pages in the list are ranked more highly. In some embodiments, the ordering or ranking gives preference to those Web pages that refer to other Web pages that are highly ranked by external means, such as by the one or more search engines used to create the initial list of Web pages.

The MASS then provides the ordered list of Web pages, so that links to the promoted Web site can be added to one or more of the pages in the ordered list. For example, the ordered list of Web pages may be provided to a user (e.g., the marketer or other user), such that the user can initiate a link placement, such as by manually placing a link on a page, requesting that a Web site operator add a link to one or more pages, or the like. In some embodiments, link placement may be performed at least in part automatically, such as by the MASS interacting with a link placement form or API, automatically posting a message (e.g., a comment to a blog entry) that includes the link, or the like. Once a link to the promoted Web site is placed, it serves as an inbound link to the promoted Web site, thereby potentially organically increasing the search engine rank of the promoted Web site, particularly to search engines that consider inbound links in their rankings.

Figure 1A:
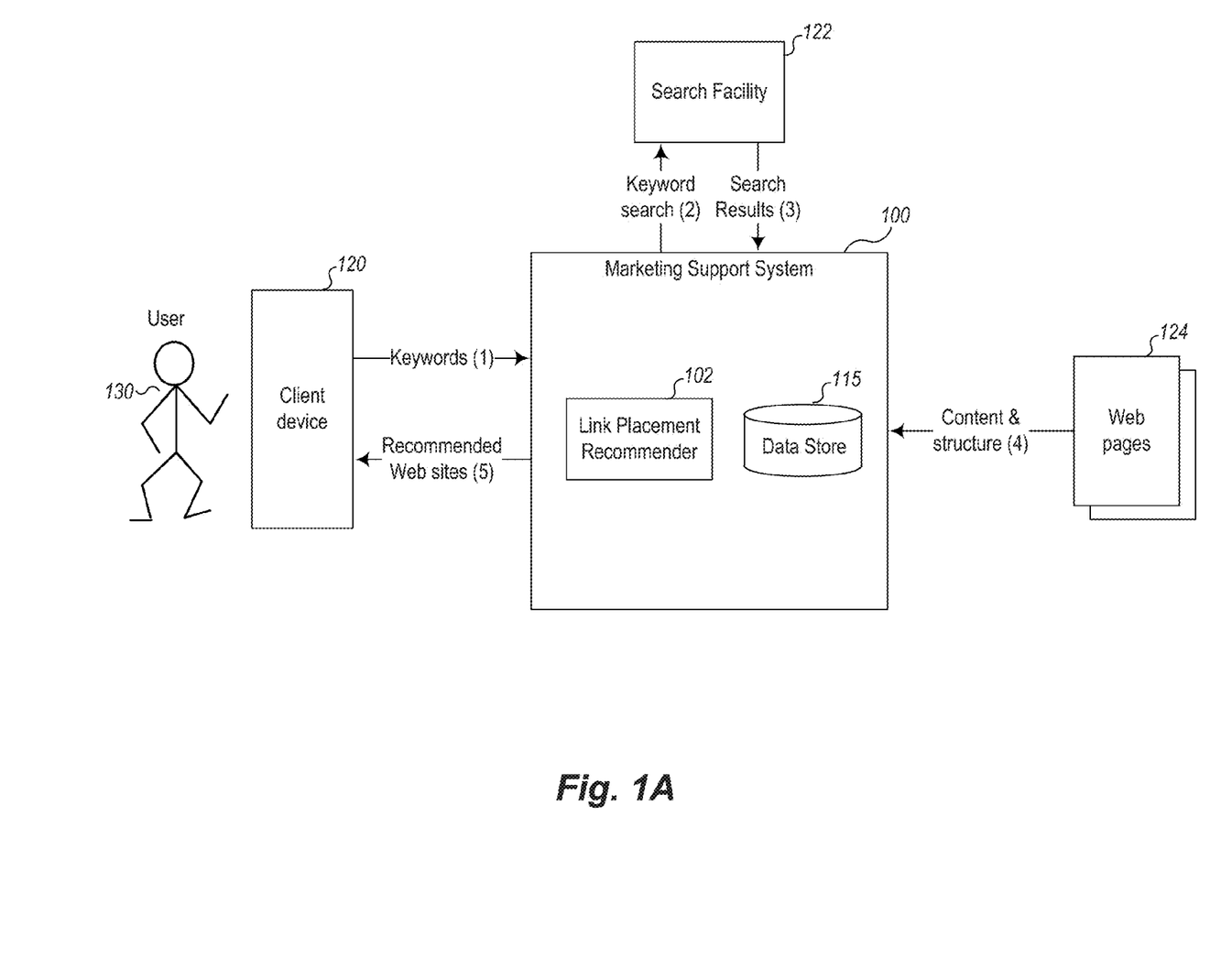
FIG. 1A illustrates an example block diagram of an example embodiment of a marketing activity support system.

FIG. 1A illustrates an example block diagram of an example embodiment of a marketing activity support system. In particular, FIG. 1A illustrates a marketing activity support system ("MASS") 100 that a link placement recommender 102 and a data store 115.

As an overview of the operation of an example embodiment, a user 130 (e.g., sales representative, marketing agent, researcher, advertiser, Web site owner, Web site operator, online agency) utilizes the MASS 100 to manage a marketing campaign. As part of the campaign, the user 130 may utilize the MASS 100 to obtain information about other Web pages or other content sources that may be good candidates for link placement, as well as possibly to perform other marketing-related activities, such as creating and transmitting marketing messages, determining suitable keywords for advertising purchases, generating and managing marketing leads, determining the effectiveness of various marketing activities, and the like.

In the illustrated example embodiment, the user 130 first provides (activity 1) keywords to the link placement recommender 102. The keywords typically describe some subject matter domain that is of interest to the marketer, such as because the marketer is promoting a good or service that is situated in or otherwise relevant to the subject matter domain. The keywords may be provided as one or more sets of keywords, each set of keywords describing or otherwise related to the subject matter.

Next, the link placement recommender 102 initiates (activity 2) one or more keyword searches using the search facility 122. The search facility 122 may be any logic/system that ranks Web pages or other network accessible content based at least in part on keywords provided within a search query, including publicly available, "off-the-shelf" search engines (e.g., Google search, Yahoo search, Bing search), proprietary/non-public indexes or information stores (e.g., LexisNexis), or the like. In response, the link placement recommender 102 receives (activity 3) from the search facility 122 results for the one or more keyword searches. The search results typically include references (e.g., URLs) to one or more Web pages that are determined by the search facility 122 to be relevant to at least some of the provided keywords.

Then, the link placement recommender 102 obtains (4) information about the content and structure of the Web pages included in the search results. Here the link placement recommender 102 may generate or otherwise build a graph or other data structure that represents the interconnections between the Web pages of the result set. Using the generated graph, the link placement recommender 102 then determines relevant Web pages of the result set, and provides a ranked list as recommended Web sites to the user. As noted above, determining the relevant Web pages may be based at least in part on the frequency of links from the relevant Web pages to other Web pages in the result set.

The data store 115 is generally used to store or record information used by components of the MASS 100, including information about operations performed by the link placement recommender 102. For example, the link placement recommender 102 may cache or otherwise record keyword sets for a user, such that the link placement recommender 102 can from time to time determine whether any new relevant Web pages have come online. For example, the link placement recommender 102 may process a keyword set on a weekly basis, and if the results are sufficiently different from a prior result, notify the user by sending an email or other message. The data store 115 may also be used to record intermediate results, such as a graph or other data structure, such that the graph need not be fully reconstructed for subsequent queries.

The described techniques herein are not limited to the specific architecture shown in FIG. 1A. In some embodiments, additional functions may be performed by the MASS 100. For example, the search facility 122 may be internal to the MASS 100. In other embodiments, the MASS 100 may not interact directly with users, but rather provide user interface components (e.g., plug-ins or widgets) that may be embedded or otherwise incorporated in third-party applications or systems, such as Web sites, smart phones, desktop systems, and the like. In further embodiments, the MASS 100 may provide an application program interface, such that external programs can programmatically interact with or invoke functions of the MASS 100.

In addition, although the described techniques for link placement recommendation are illustrated primarily with respect to textual Web pages and marketing content, other structures and/or forms of content are contemplated, including any network-accessible resources, such as audio, images, and/or video, as well as active or interactive content such as interactive applications (e.g., code modules, programs, online applications, smart phone applications), games, and the like. In particular, the MASS may recommend content sources/entities other then Web pages or Web sites. In general, the MASS can recommend any entity that is referenced by a Web page or other referencing content, including messaging services and/or users, including blogs, microblogs, online forums, and the like. In some embodiments, the MASS can identify relevant messaging users (e.g., Twitter users) based on how frequently those users are referenced by Web pages or other analyzed content.

Figure 1B:
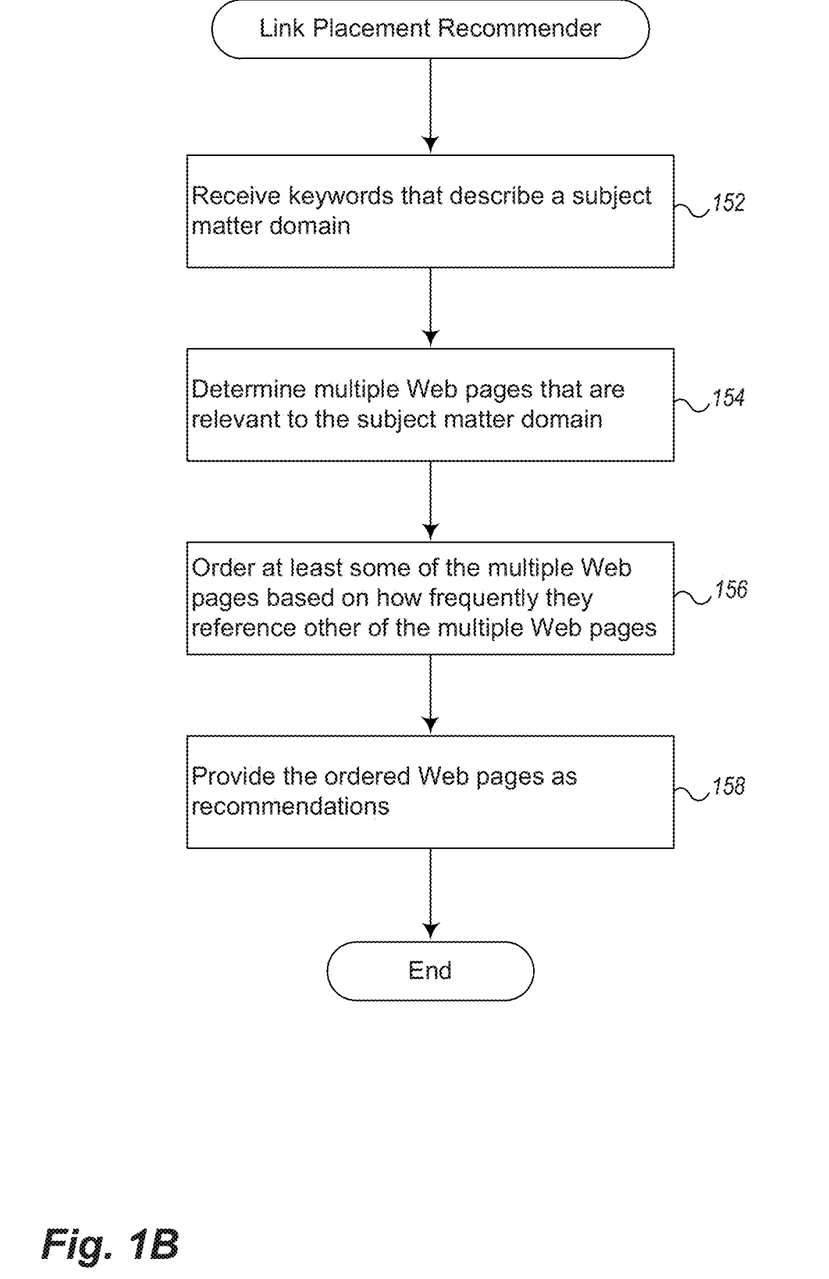
FIG. 1B illustrates an example flow diagram of a link placement recommendation process performed by a marketing activity support system according to an example embodiment.

FIG. 1B illustrates an example flow diagram of a link placement recommendation process performed by a marketing activity support system according to an example embodiment. The process may be performed by, for example, one or more of the components of the MASS 100 described with respect to FIG. 1A.

The illustrated process begins at block 152, where it receives one or more keywords that describe a subject matter domain. In some embodiments, the keywords are received from a user via an interactive user interface. In other embodiments, the keywords may be received programmatically, such as when the process is operating in "batch" or "bulk" mode, and processing a sequence of previously stored inputs. Example keywords may be provided as a text string that includes delimited (e.g., by a space, comma, colon) words or phrases. As an example to be used throughout the description of the illustrated process, the process may receive the keywords "home improvement tools."

At block 154, the process determines multiple Web pages that are relevant to the subject matter domain. Determining the multiple Web pages may include initiating a search by forming a search query that includes at the received keywords. Continuing the above example, the process would create a search query that would include the keywords "home improvement tools." In response, the process receives a result set that includes multiple Web pages that are ranked in order of relevance with respect to the received keywords. Further to the above example, the process may receive a list of ten URLs that each point to a respective Web page, denoted here as P1, P2, . . . , P10.

At block 156, the process orders at least some of the multiple Web pages based on how frequently they reference other of the multiple Web pages. Ordering the Web pages may include generating a graph or other data structure of the interconnections between the multiple Web pages. In the present example, a graph between the ten Web pages of the result set may be described as by Table 1, below.

TABLE 1

| Page | References |
|------|------------|
| P1   | {P2, P5}   |
| P2   | {P3}       |
| P3   | {P2, P8}   |
| P4   | { }        |
| P5   | { }        |
| P6   | {P3, P4}   |
| P7   | {P1, P3, P4} |
| P8   | { }        |
| P9   | {P1, P2, P3, P5} |
| P10  | {P4, P5}   |

Table 1 is an adjacency list representation of the interconnections between the ten Web pages of the example result set. Table 1 denotes, for each page of the result set (P1, P2, . . . , P10), a reference set that includes zero or more other pages of the result set that are referenced by that page. For example, page P1 references (e.g., links to) pages P2 and P5; page P2 references page P3; pages P4, P5, and P8 do not reference any of pages P1-P10; etc. Other representations are contemplated, including adjacency matrixes, link and node structures, or the like. Also, in the illustrated embodiment, a reference set only contains unique references, such that a page with many duplicate links has no impact on the scoring process describe below. In other embodiments, duplicate references may be treated differently, such as by penalizing Web pages for excessive link duplication.

Ordering the Web pages includes scoring each Web page in the result set based at least in part on link frequency to other pages in the result set. In one embodiment, each Web page gets a score of one "point" for each referenced Web page. Scores can thus be determined in a straightforward manner based on the contents of Table 1, by taking the cardinality of each reference set, as shown in Table 2, below.

TABLE 2

| Page | References | Score |
|---|---|---|
| P1 | {P2, P5} | 2 |
| P2 | {P3} | 1 |
| P3 | {P2, P8} | 2 |
| P4 | { } | 0 |
| P5 | { } | 0 |
| P6 | {P1, P4} | 2 |
| P7 | {P1, P3, P4} | 3 |
| P8 | { } | 0 |
| P9 | {P1, P2, P3, P5} | 4 |
| P10 | {P4, P5} | 2 |

Table 2 is includes the contents of Table 1 with an additional column (Score) that includes a score that is equal to the cardinality of the corresponding reference set for each row.

Once the pages have been scored, they can be ordered based on the score. In the above example, one example non-increasing order based on the determined scores is: P9, P7, P1, P3, P6, P10, P2, P4, P5, and P8. In some embodiments, only Web page having a score that is higher than some threshold may be included in a final ordering, such that low scoring pages are discarded, and the user is not presented with pages that are not good candidates for link placement.

In addition, some embodiments may take other factors into account during scoring. For example, some embodiments may give weight to the ranking provided as part of the original search result, such that pages that reference high ranking pages are scored more highly than those referencing low ranking pages. In the above example, the search engine may have provided the results P1-P10 in decreasing order of relevance, such that P1 was deemed to be the most relevant page and P10 was deemed to be the least relevant page. In such a case, page P6 would be scored more highly than P10 because, even though P6 and P10 both reference two pages, P6 references P1 and P4, which are more highly ranked than the pages (P4 and P5) referenced by P10.

Another factor that may be used for scoring is the number of links to pages that are not in the result set. Thus, some embodiments may consider the "concentration" or "density" of links to pages in the result set with respect to links to pages that are not in the result set, such that pages that have many links that do not reference the result set may be scored lower than pages that have fewer links that do not reference the result set. In one embodiment, scoring is based at least in part on a ratio of the number of links to pages in the result set to the number of links to pages not in the result set.

A further factor that may be used for scoring is the likelihood that a particular page can be a target for link placement. For example, some pages (e.g., those in the .gov domain, or those belonging to famous brands) may not be good candidates for link placement because they are unlikely to include a link to a third-party commercial Web page. Thus, in one embodiment, scoring is based at least in part on the likelihood that a link can be placed on a particular Web page.

Yet another factor that may be used for scoring is whether or not a page in the result page already references the promoted/target Web page. For example, pages that do not reference the promoted Web page may be scored more highly, because they are likely to be valuable in terms of providing new inbound links to the promoted Web page.

Another technique may include scoring Web pages based on search results obtained from multiple distinct search engines. For example, for each set of keywords, a search result set may be obtained from multiple search engines. Then, Web page scoring may be based on an aggregation of the received search results and/or search engine rankings of individual Web pages. In this manner, the link placement recommender may identify Web pages that will likely yield valuable link placement opportunities for optimizing search engine results across multiple search engines.

At block 158, the process provides the ordered Web pages as recommendations for link placement opportunities.

FIGS. 2A-2G illustrate example screen displays provided by an example embodiment of a marketing activity support system. In the illustrated example, the screen displays are presented by a Web browser interacting with the MASS and executing on a client device, such as a desktop computing system. Variations on the illustrated screen displays are contemplated, including other user interface elements, more or less information, different orders of presentation, and the like. In one embodiment, a "mobile" version of at least some of the illustrated screens is provided by the MASS, such that users of smart phones or other limited display devices can access at least some of the functions of the MASS.

Figure 2A:
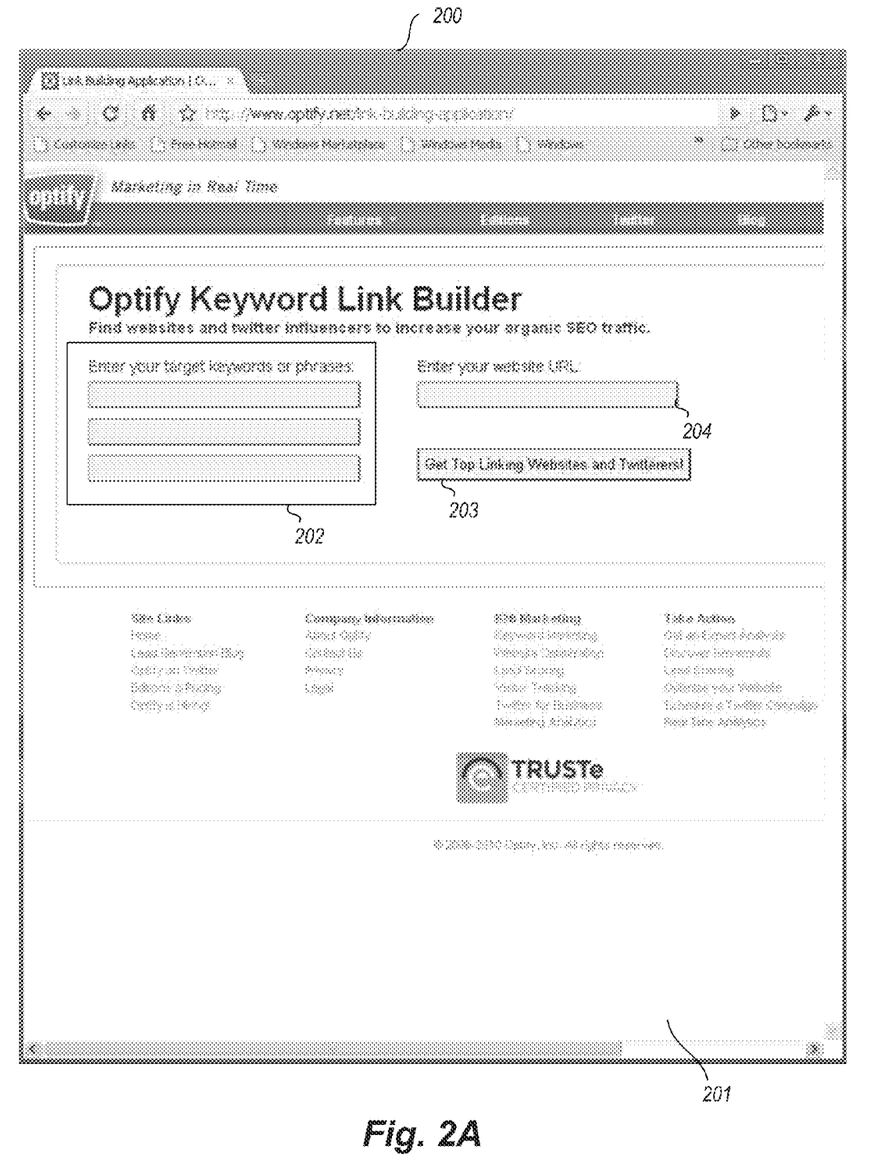
FIGS. 2A-2G illustrate example screen displays provided by an example embodiment of a marketing activity support system.

FIG. 2A illustrates a link placement recommendation page (a "Link Builder") provided by an example embodiment of a marketing activity support system. In particular, FIG. 2A illustrates a Web browser 200 that displays a screen 201 (e.g., a Web page) that is being used by a user to interact with the marketing activity support system. The screen 201 includes user interface controls (text entry fields) 202 that can be used by the user to specify one or more sets of keywords. The screen also includes a control (button) 203 that, when selected by the user, initiates the link placement recommendation process described herein. The screen further includes a control 204 (text field) that can be used by the user to specify a URL of the promoted Web site, so that the user can see where their Web site ranks among the returned recommendations.

Figure 2B:
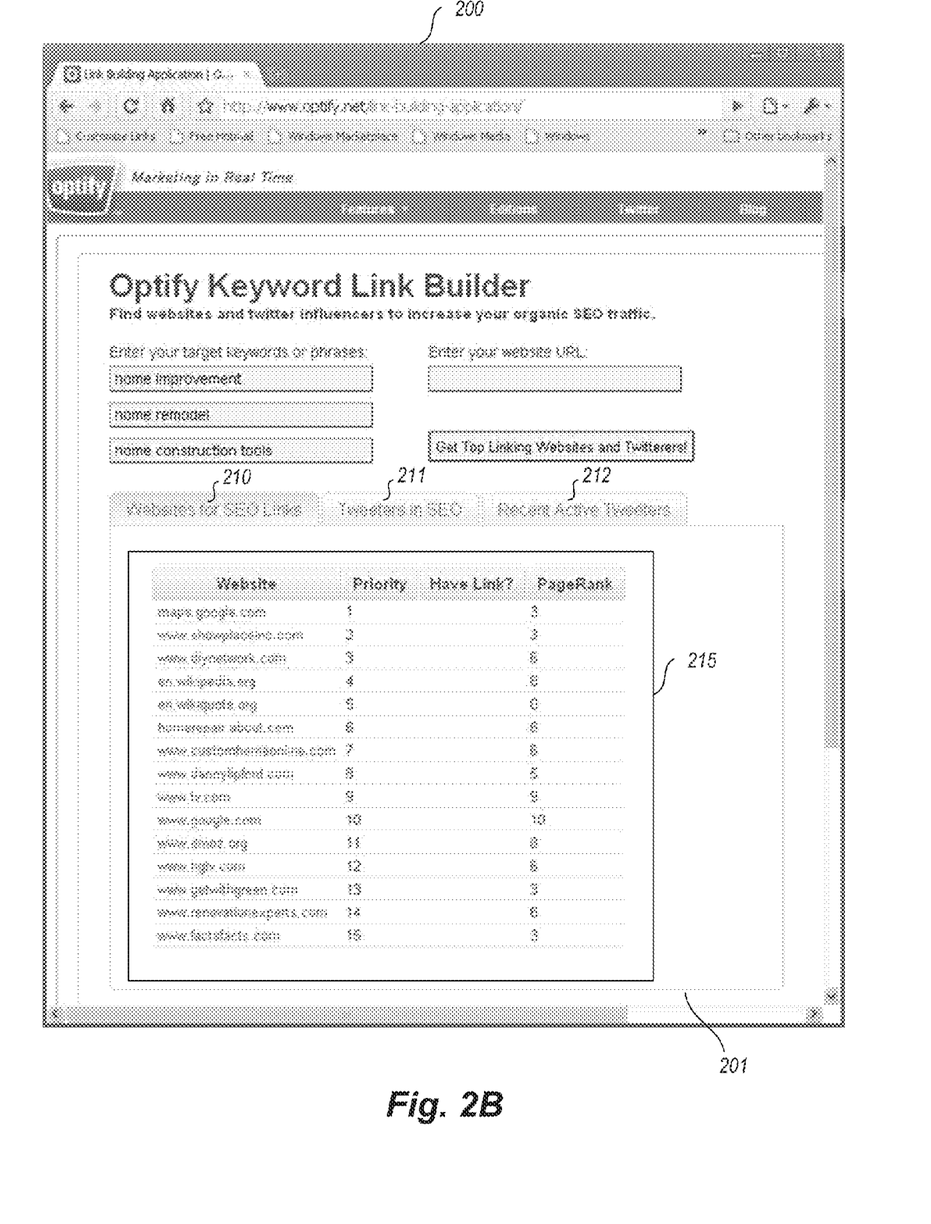

FIG. 2B illustrates the link placement recommendation screen 201 after recommendations for a set of user-specified keywords have been provided. In this example, the user has specified three sets of keywords: "home improvement," "home remodel," and "home construction tools." In response, the MASS provides recommendations organized into tabs 210-212 that respectively identify relevant Web sites, Twitter users referenced by Web pages, and Twitter users by activity.

Tab 210 is currently active and includes a table 215 that arranges Web sites (e.g., denoted by domain name) in non-increasing order of a score based on link frequency and other factors as described herein. Each row of the table 215 includes a Web site reference (e.g., a URL) field, a priority field (e.g., indicating a rank or position based on the recommender's scoring algorithm), and a web search rank field (e.g., PageRank, hubs and authorities rank, or the like). In this example, 15 Web sites are listed in table 215, which may be a fraction of the total number of Web pages returned by searches for the provided keywords. In one embodiment, the link placement recommender performs one search for each keyword set, and processes 100 results for each search. Thus, in the current example having three keyword sets, a total of 300 (possibly non-unique) result Web pages would be considered by the link placement recommender.

Figure 2C:
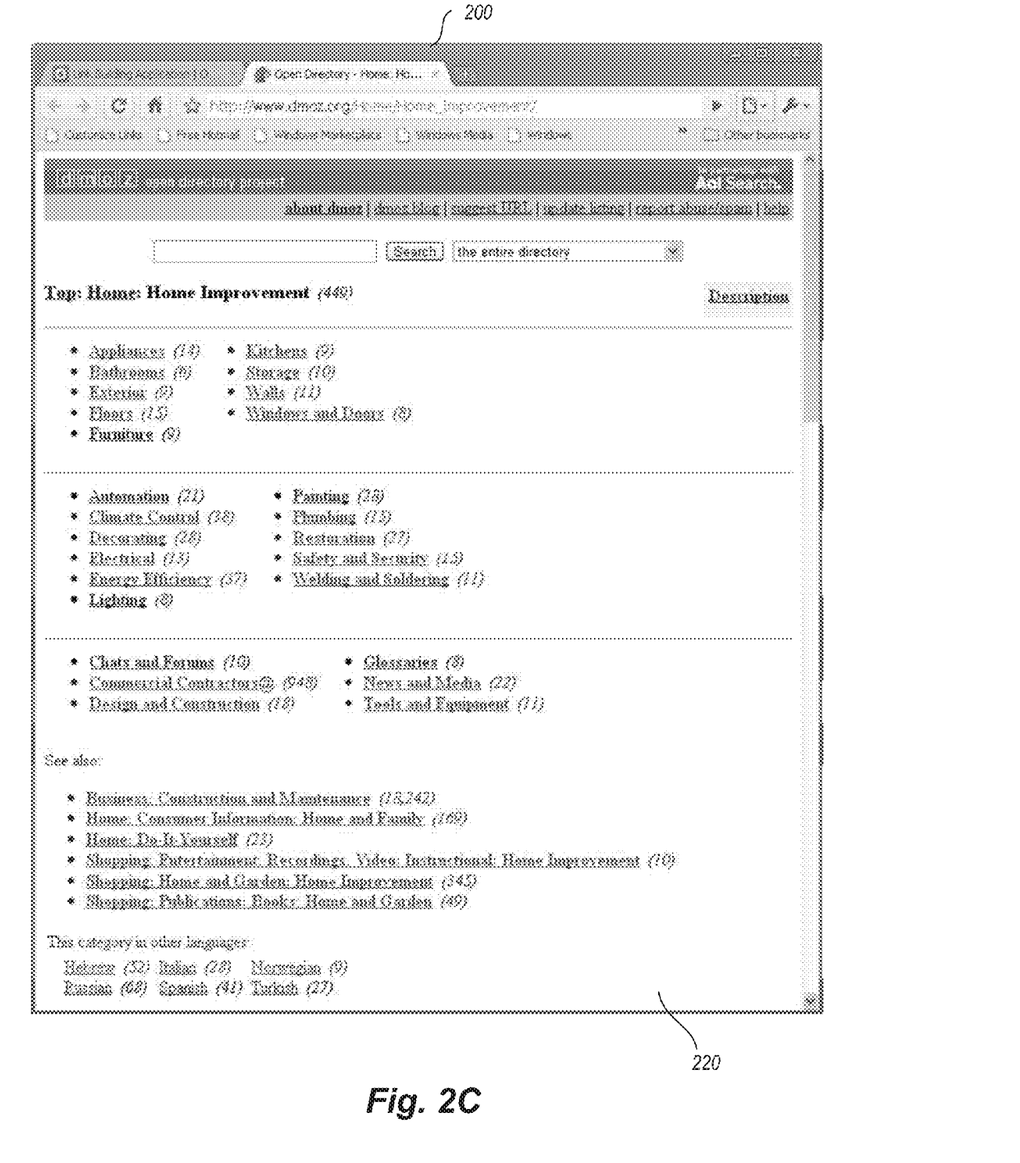

FIG. 2C illustrates an example Web page identified by the link placement recommender as described with respect to FIG. 2B. Here, the user has selected the link named "www.dmoz.org" in tab 210 of screen 201. In response, the browser 200 has loaded and presented on screen 220 the corresponding Web page (at www.dmoz.org/Home/Home_Improvement/), which is a directory that includes links to various home improvement Web pages. Such a directory is typically a good candidate for link placement, as this directory likely links to other Web pages that are in the domain specified by the provided keywords (e.g., home improvement). Thus, a user who wants to find a home improvement-related Web site would be likely to visit the displayed Web page for references.

Figure 2D:
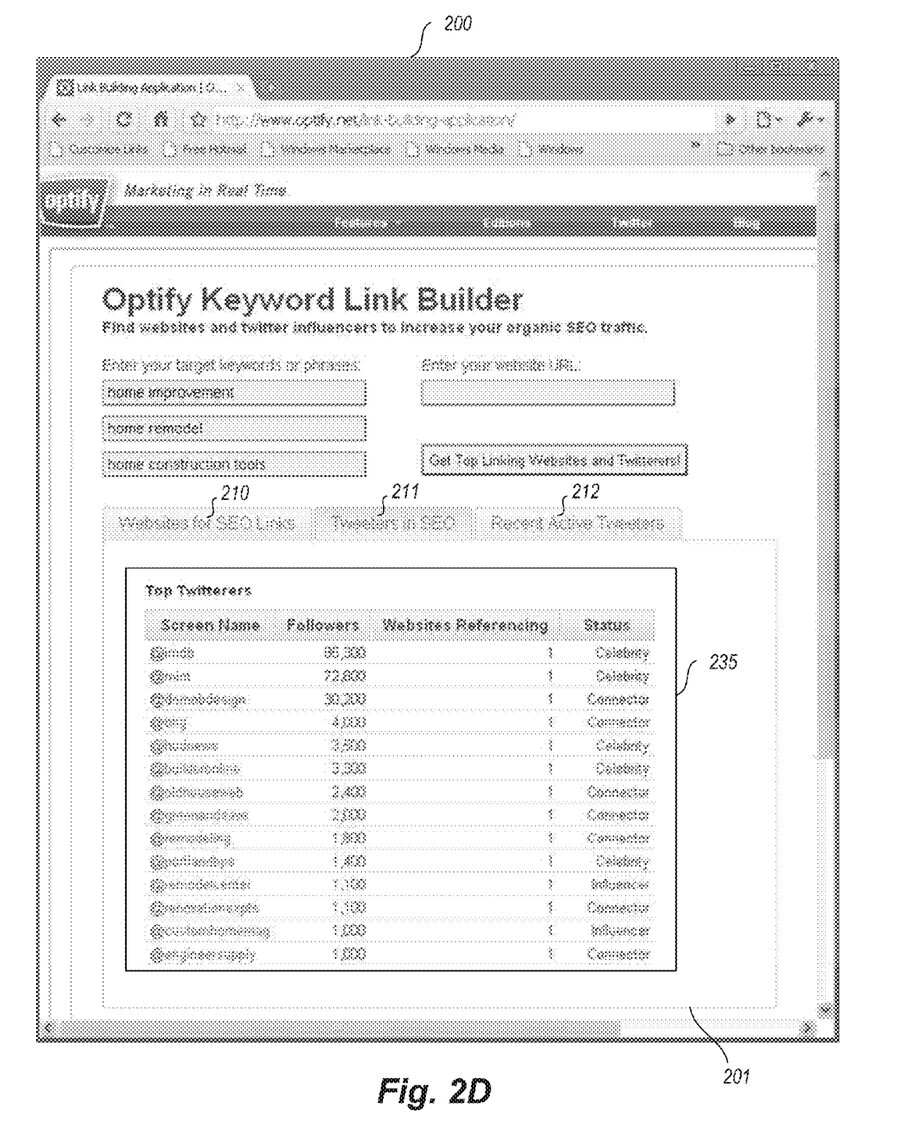

FIG. 2D illustrates the link placement recommendation screen 201 presenting Twitter users referenced by Web pages. As noted, the MASS can in some embodiments recommend other sources of content besides Web pages, including messaging users such as bloggers, microbloggers, online forum posters, and the like. In particular, the screen 201 is shown after activation of the tab 211. Tab 211 includes a table 235 that arranges Twitter users based on how frequently those users are referenced or otherwise mentioned on Web pages in the result set. Some embodiments order the Twitter users based on how frequently those users are uniquely referenced by Web pages in the result set, such that Web pages that include many duplicate references do not adversely impact scoring. Each row in the table 235 specifies a Twitter user, a number of followers, and a status. In the illustrated example, Twitter users are ranked by the number of references and by the number of readers (e.g., followers).

Figure 2E:
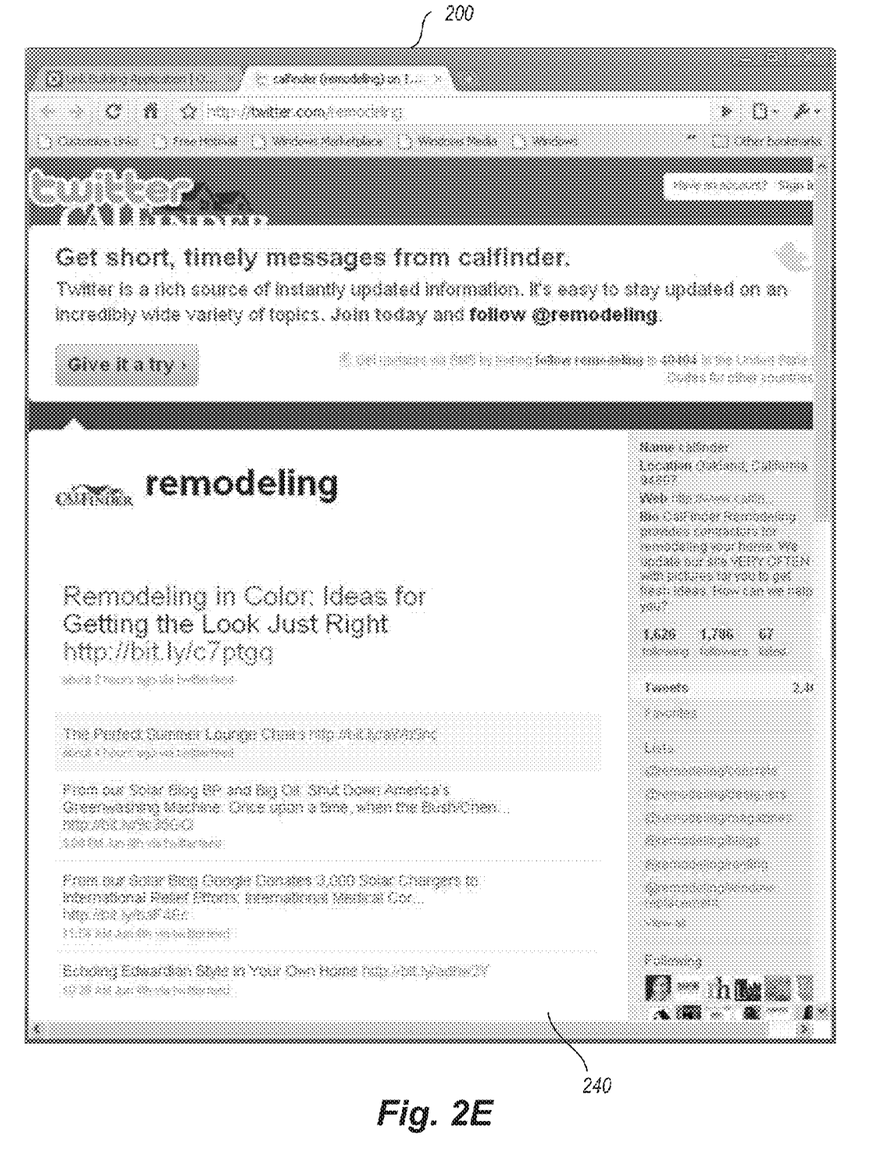

FIG. 2E illustrates an example Twitter user identified by the link placement recommender as described with respect to FIG. 2D. Here, the user has selected the Twitter user named "remodeling" in tab 211 of screen 210. In response, the browser 200 has loaded and presented on screen 240 the corresponding Twitter page for the user, who operates a message feed related to remodeling and/or home improvement topics. Such a Twitter user represents a good candidate for a relationship with the marketing user. For example, the marketing user could interact with the Twitter user and request that the Twitter user post a link and/or review of a Web page being promoted by the marketing user.

Figure 2F:
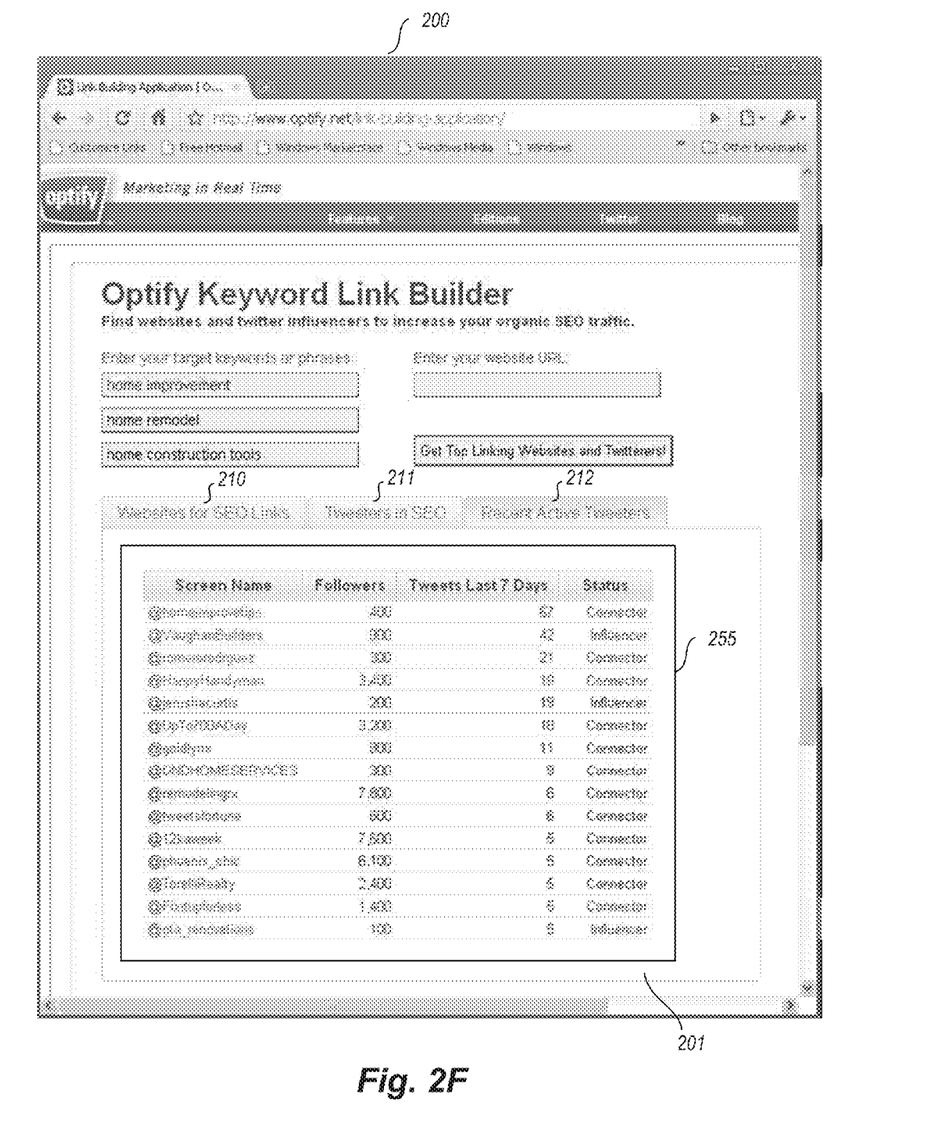

FIG. 2F illustrates the link placement recommendation screen 201 presenting Twitter users based on activity. In particular, the screen 201 is shown after activation of the tab 212. Tab 212 includes a table 255 that arranges Twitter users based on how frequently those users have transmitted a message (e.g., a tweet) that is relevant to the specified keywords.

Figure 2G:
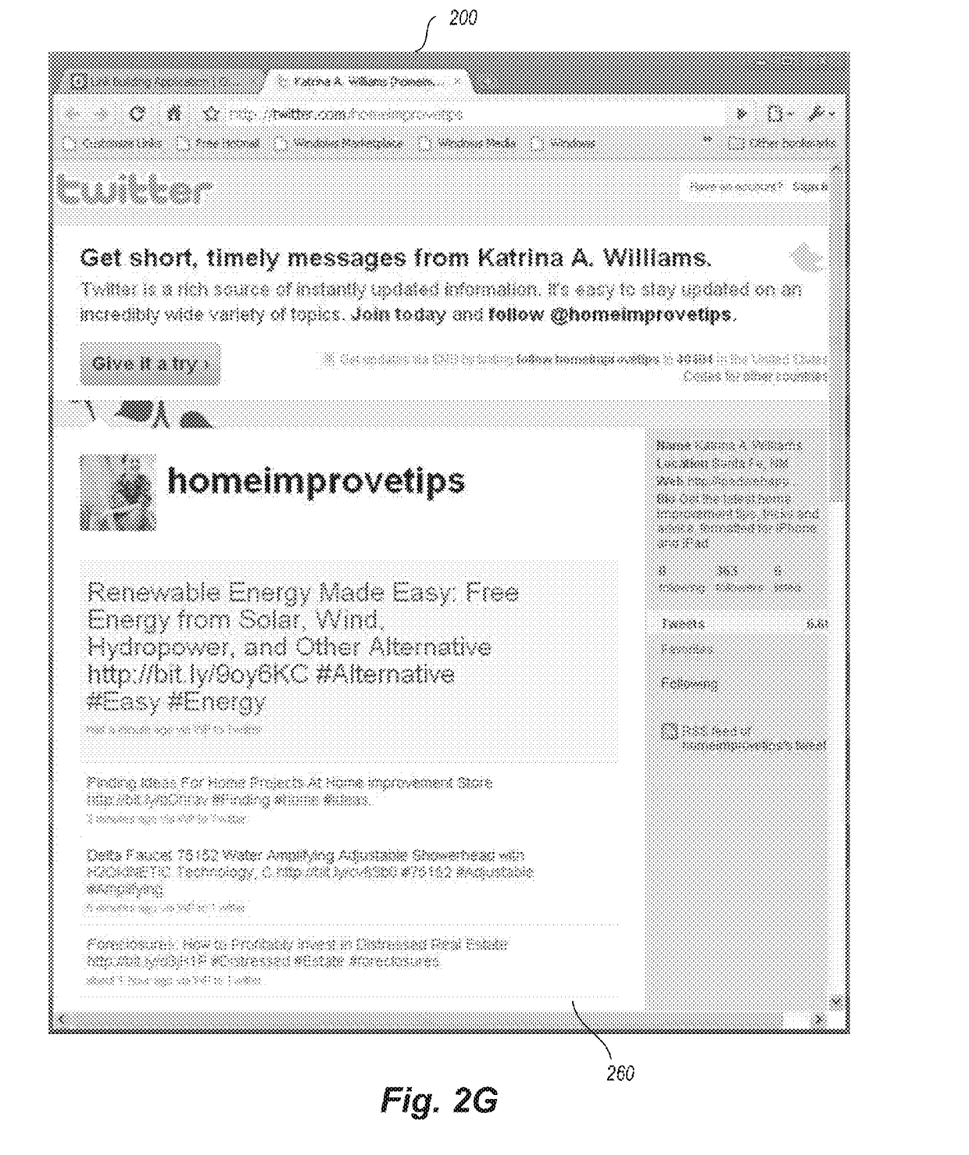

FIG. 2G illustrates an example Twitter user identified by the link placement recommender as described with respect to FIG. 2F. Here, the user has selected the Twitter user named "homeimprovetips" in tab 212 of screen 210. In response, the browser 200 has loaded and presented on screen 260 the corresponding Twitter page for the user, who operates a message feed related to remodeling and/or home improvement topics.

Note that although the link placement recommender is described with respect to the Twitter micro-blogging service, use of other messaging (e.g., one-to-one and/or broadcast in nature) services can be similarly processed. In some embodiments, other or additional broadcast messaging services may be considered by the link placement recommender, including social network status updates (e.g., a Facebook status update), news feeds (e.g., RSS), Internet news (e.g., NNTP), blogs, and the like.

Figure 3:
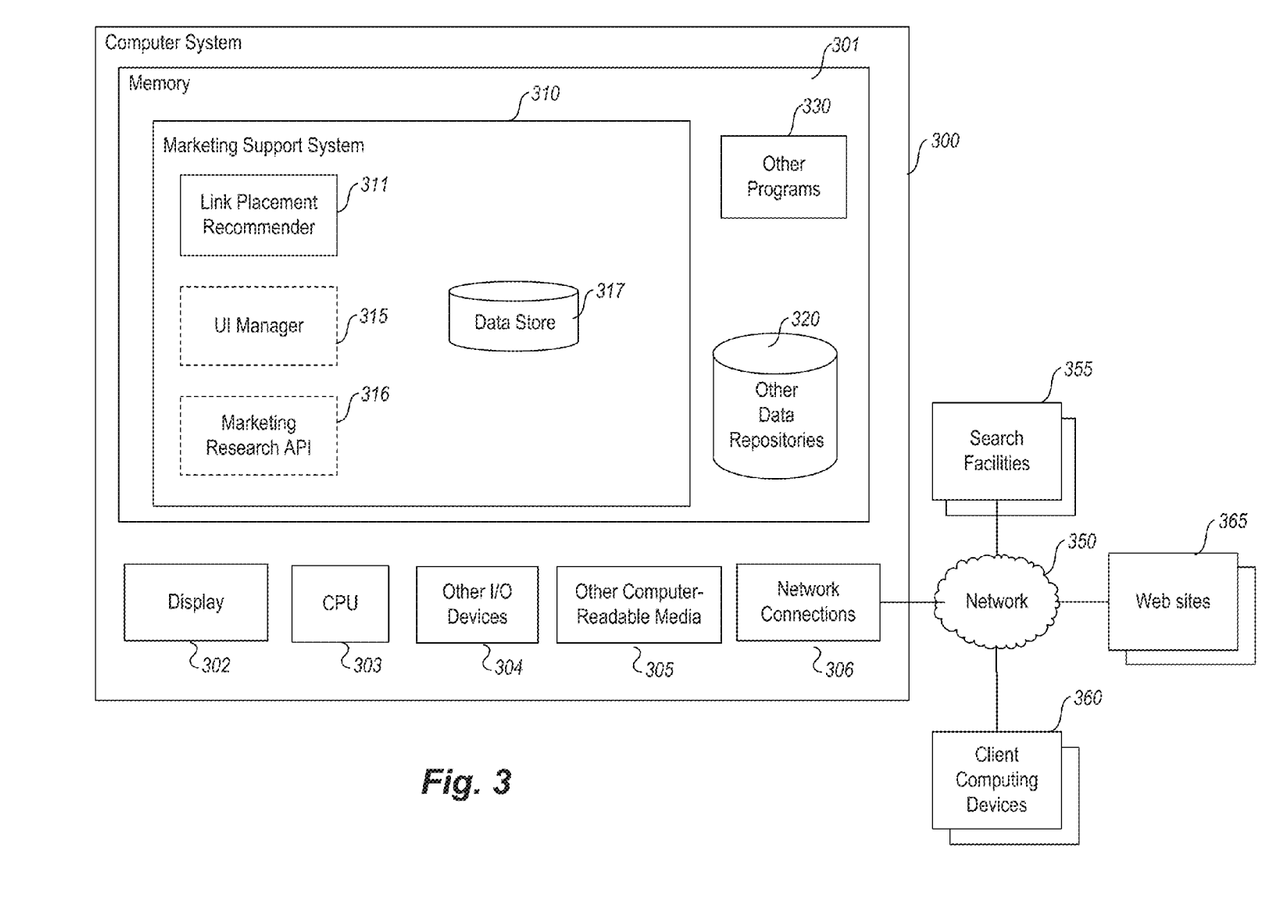
FIG. 3 is an example block diagram of an example computing system for implementing a marketing activity support system according to an example embodiment.

FIG. 3 is an example block diagram of an example computing system for implementing a marketing activity support system according to an example embodiment. In particular, FIG. 3 shows a computing system 300 that may be utilized to implement a marketing activity support system 310 that facilitates marketing activities as described herein.

Note that one or more general purpose or special purpose computing systems/devices may be used to implement the marketing activity support system 310. In addition, the computing system 300 may comprise one or more distinct computing systems/devices and may span distributed locations. Furthermore, each block shown may represent one or more such blocks as appropriate to a specific embodiment or may be combined with other blocks. Also, the marketing activity support system 310 may be implemented in software, hardware, firmware, or in some combination to achieve the capabilities described herein.

In the embodiment shown, computing system 300 comprises a computer memory ("memory") 301, a display 302, one or more Central Processing Units ("CPU") 304, Input/Output devices 304 (e.g., keyboard, mouse, CRT or LCD display, and the like), other computer-readable media 305, and network connections 306. The marketing activity support system 310 is shown residing in memory 301. In other embodiments, some portion of the contents, some or all of the components of the marketing activity support system 310 may be stored on and/or transmitted over the other computer-readable media 305. The components of the marketing activity support system 310 preferably execute on one or more CPUs 303 and extract and provide quotations, as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide or include the other computer-readable media 305 or the display 302.

In a typical embodiment, the marketing activity support system 310 includes a link placement recommender 311, a user interface manager 315, a marketing activity support system application program interface ("API") 316, and a data store 317. The user interface manager 315 and MASS API 316 are drawn in dashed lines to emphasize that in other embodiments, functions performed by one or more of these components may be performed externally to the marketing activity support system 310. In other embodiments, the marketing activity support system 310 also includes additional modules, such as a search facility. The link placement recommender 311 and data store 317 respectively perform functions such as those described with reference to the link placement recommender 102 and the data store 115 of FIG. 1A.

The UI manager 315 provides a view and a controller that facilitate user interaction with the marketing activity support system 310 and its various components. For example, the UI manager 315 may provide interactive access to the marketing activity support system 310, such that users can obtain recommendations and possibly perform various activities (e.g., initiate contact, request link placement) with respect to the obtained recommendations. In some embodiments, access to the functionality of the UI manager 315 may be provided via a Web server, possibly executing as one of the other programs 330. In such embodiments, a user operating a Web browser executing on one of the client devices 360 can interact with the marketing activity support system 310 via the UI manager 315.

The MASS API 316 provides programmatic access to one or more functions of the marketing activity support system 310. For example, the API 316 may provide a programmatic interface to one or more functions of the marketing activity support system 310 that may be invoked by one of the other programs 330 or some other module. In this manner, the API 316 facilitates the development of third-party software, such as user interfaces, plug-ins, news feeds, adapters (e.g., for integrating functions of the marketing activity support system 310 into Web applications), and the like. In addition, the API 316 may be in at least some embodiments invoked or otherwise accessed via remote entities, such as one of the Web sites 365 and/or client computing devices 360, to access various functions of the marketing activity support system 310. For example, a third-party application may request link placement recommendations from the marketing activity support system 310 via the API 316.

The marketing activity support system 310 interacts via the network 350 with search facilities 355, Web sites 365, and client computing devices 360. In particular, the marketing activity support system 310 obtains search results from the one or more search facilities 355, obtains content and structure information about Web pages from the Web sites 365, and provides marketing activity services to the client computing devices 360. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 360 include desktop computing systems, notebook computers, mobile phones, smart phones, personal digital assistants, and the like.

In an example embodiment, components/modules of the marketing activity support system 310 are implemented using standard programming techniques. For example, the marketing activity support system 310 may be implemented as a "native" executable running on the CPU 303, along with one or more static or dynamic libraries. In other embodiments, the marketing activity support system 310 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the marketing activity support system 310, such as in the data store 317, can be available by standard mechanisms such as through C, C++, C#, and Java APIs; libraries for accessing files, databases, or other data repositories; through markup languages such as XML; or through Web servers, FTP servers, or other types of servers providing access to stored data. The data store 317 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the marketing activity support system 310 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
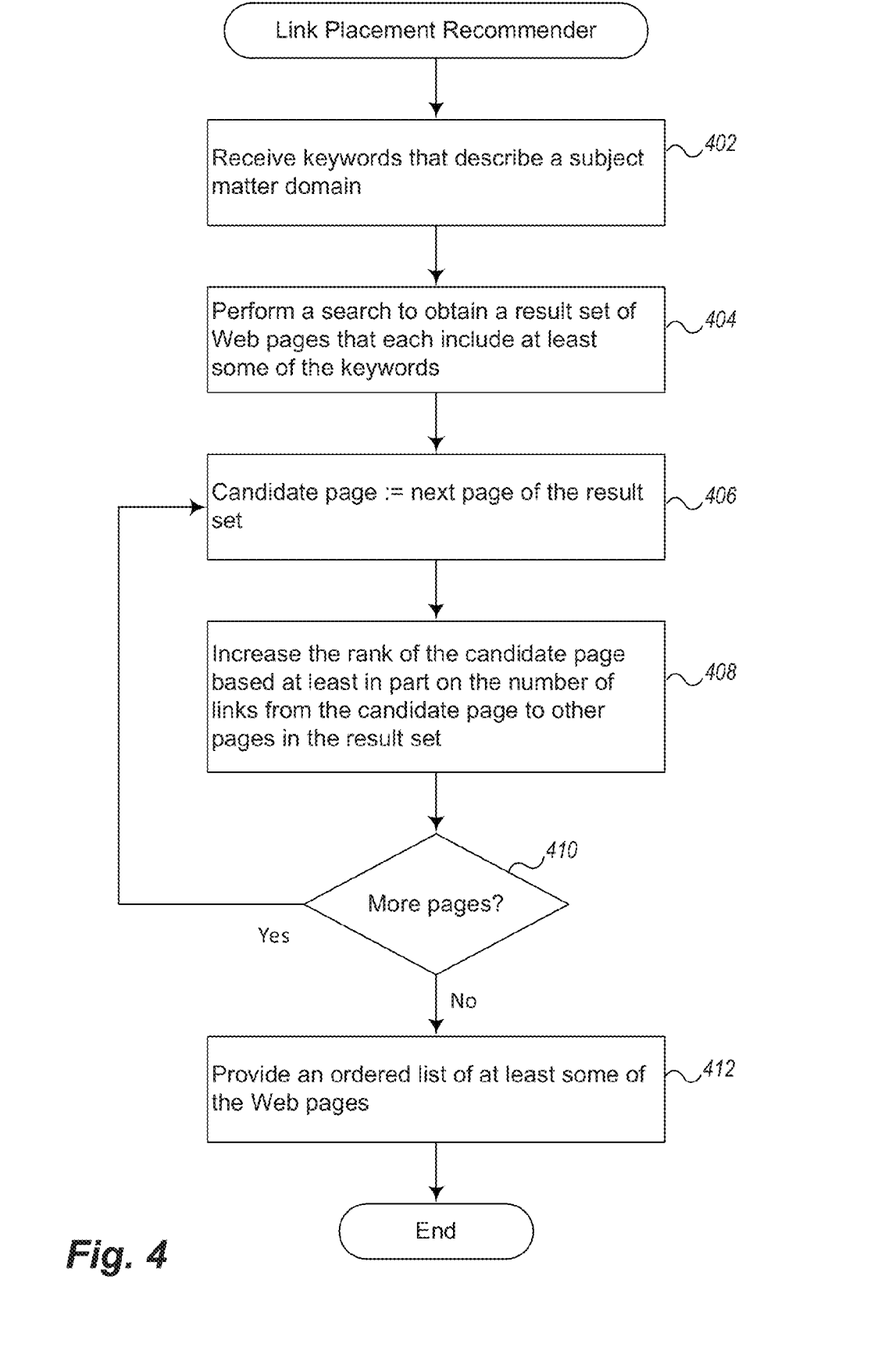
FIG. 4 illustrates an example flow diagram of a link placement recommendation process performed by a marketing activity support system according to an example embodiment.

FIG. 4 illustrates an example flow diagram of a link placement recommendation process performed by a marketing activity support system according to an example embodiment. In particular, FIG. 4 illustrates a process that may be implemented by, for example, one or more elements of the marketing activity support system 100 described with reference to FIG. 1A. The process recommends Web pages based on link reference frequency.

The illustrated process begins at block 402, where it receives keywords that describe a subject matter domain.

At block 404, the process performs a search to obtain a result set of Web pages that each includes at least some of the keywords. Such results may be obtained by use of a search engine that provides links (e.g., URLs) to pages that match at least some of the provided keywords. In addition, the result set may be ordered (e.g., ranked) by a ranking algorithm employed by the search engine (e.g., Google PageRank, hubs and authorities).

In blocks 406-410 the routine performs a loop in which it processes each of the Web pages returned by the search result.

At block 406, the process sets a candidate page to be the next page of the result set obtained via the search.

At block 408, the process increases the rank of the candidate page based at least in part on the number of links from the candidate page to other pages in the result set. For example, the process may increase a score for the candidate page by a constant factor (e.g., one point) for each reference from the candidate page to one of the pages in the result set. Other factors may be taken into account, such as the search engine rank of the referenced web page, the likelihood that the candidate page can is likely to be amenable to link placement (e.g., whitehouse.gov is less likely to be amenable to link placement than a blog page), or the like.

At block 410, the process determines whether there are more pages in the result set, and if so, continues the loop of blocks 406-410, else proceeds to block 412.

At block 412, the process provides an ordered list of at least some of the Web pages. As noted the result set may include many (e.g., hundreds or thousands) Web pages. In some cases, the routine selects some fraction of those Web pages, such as the top ten (based onto determined rank) for presentation, so as not to overwhelm the user with information. After block 412, the process ends.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/352,701, filed on Jun. 8, 2010, entitled "RECOMMENDING LINK PLACEMENT OPPORTUNITIES," and Non-Provisional patent application Ser. No. 13/155,782, filed on Jun. 8, 2011 and published as U.S. Patent Publication No. 2011/0302145 on Dec. 8, 2011, entitled "RECOMMENDING LINK PLACEMENT OPPORTUNITIES," are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for link placement recommendation are applicable to other architectures or environments. Also, the methods, techniques, and systems discussed herein are applicable to differing languages, protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for providing Web page recommendations for the creation of inbound links to a target Web page, comprising:
   a) receiving one or more keywords that describe a subject matter domain associated with the target Web page;
   b) determining, using one or more search engines, a plurality of Web pages that refer to the received one or more keywords;
   c) for a given Web page of the plurality of Web pages, identifying each unique relevant link within the given Web page and determining a total number of relevant links within the given Web page, wherein each unique relevant link is directed to any other of the plurality of Web pages that refer to the received one or more keywords;
   d) for a given Web page of the plurality of Web pages, determining a total number of non-relevant links within the given Web page, wherein each non-relevant link is directed to any Web page that is not included within the plurality of Web pages that refer to the received one or more keywords;
   e) performing c) and d) for each of the plurality of Web pages;
   f) for a given Web page of the plurality of Web pages, determining a ratio of the total number of unique relevant links in the given Web page to the total number non-relevant links in the given Web page;
   g) performing f) for each of the plurality of Web pages;
   h) ordering the plurality of Web pages by their ratio of the total number of unique relevant links to the total number non-relevant links to generate an ordered set of the plurality of Web pages; and
   i) providing the ordered set of the plurality of Web pages as recommended Web pages in which to create inbound links to the target Web page.

2. The computer-implemented method of claim 1, wherein the plurality of Web pages are ranked over a prescribed threshold by the one or more search engines.

3. The computer-implemented method of claim 1, wherein the ordered set of the plurality of Web pages are ranked by applying at least one of a PageRank algorithm or a Hubs and Authorities algorithm.

4. The computer-implemented method of claim 1, further comprising:
   filtering the ordered set of the plurality of Web pages to remove any of the plurality of Web pages that do not allow for placement of a link within itself to the target Web page.

5. The computer-implemented method of claim 1, further comprising:
   filtering the ordered set of the plurality of Web pages to remove any of the plurality of Web pages that already includes a link to the target Web page.

6. The computer-implemented method of claim 1, further comprising:
   providing an online user interface that is configured to receive the one or more keywords and list the ordered set of the plurality of Web pages as recommended Web pages in which to create inbound links to the target Web page.

7. The computer-implemented method of claim 6, wherein the online user interface is configured to display an indication of search engine rank for each Web page in the ordered set of the plurality of Web pages.

8. The computer-implemented method of claim 1, further comprising:
   providing links to each Web page in the ordered set of the plurality of Web pages.

9. The computer-implemented method of claim 1, further comprising:
   adding at least one link to the target Web page on one or more of the plurality of Web pages to create at least one inbound link to the target Web page.

10. The computer-implemented method of claim 1, wherein the one or more search engines include one or both of a commercially available search engine and a publicly available search engine.

11. The computer-implemented method of claim 1, further comprising:
   creating a graph that represents links contained in each of the plurality of Web pages;
   determining which ones of the plurality of Web pages are ranked above a threshold number;
   using the graph, selecting, as a resulting set of potential Web pages to be recommended, one or more of the plurality of Web pages that include links to at least one of the plurality of Web pages that are ranked above the threshold number;

ordering the selected resulting set of potential Web pages based on how many links to at least one of the plurality of Web pages that are ranked above the threshold number are determined to be present in each of the selected resulting set of potential Web pages; and providing indicators to the ordered selected resulting set of potential Web pages.

12. The computer-implemented method of claim 11, wherein the graph is stored as an intermediate data structure.

13. The computer-implemented method of claim 11, wherein the ones of the plurality of Web pages that are ranked above the threshold number are Web pages that are ranked using a ranking algorithm of one or both of a commercially available search engine and a publicly available search engine.

14. A computing system, comprising:
a memory; and
a module that is stored on the memory and that is configured, when executed by the computing system, to provide Web page recommendations for the creation of inbound links to a target Web page by:
 a) receiving one or more keywords that describe a subject matter domain associated with the target Web page;
 b) determining, using one or more search engines, a plurality of Web pages that refer to the received one or more keywords;
 c) for a given Web page of the plurality of Web pages, identifying each unique relevant link within the given Web page and determining a total number of relevant unique links within the given Web page, wherein each unique relevant link is directed to any other of the plurality of Web pages that refer to the received one or more keywords;
 d) for a given Web page of the plurality of Web pages, determining a total number of non-relevant links within the given Web page, wherein each non-relevant link is directed to any Web page that is not included within the plurality of Web pages that refer to the received one or more keywords;
 e) performing c) and d) for each of the plurality of Web pages;
 f) for a given Web page of the plurality of Web pages, determining a ratio of the total number of unique relevant links in the given Web page to the total number non-relevant links in the given Web page;
 g) performing f) for each of the plurality of Web pages;
 h) ordering the plurality of Web pages by their ratio of the total number of unique relevant links to the total number non-relevant links to generate an ordered set of the plurality of Web pages; and
 i) providing the ordered set of the plurality of Web pages as recommended Web pages in which to create inbound links to the target Web page.

15. The computing system of claim 14, wherein the module is further configured, when executed by the computing system, to:
 determine one or more messaging users who are referenced by at least some of the plurality of Web pages, the determined one or more messaging users having posted messages about the subject matter domain associated with the target Web page; and
 provide indicators of the one or more messaging users.

16. The computing system of claim 14, wherein the module is further configured, when executed by the computing system, to provide links to each Web page in the ordered set of the plurality of Web pages.

17. The computing system of claim 14, wherein the module is further configured, when executed by the computing system, to add at least one link to the target Web page on one or more of the plurality of Web pages to create at least one inbound link to the target Web page.

18. The computing system of claim 14, wherein the one or more search engines include one or both of a commercially available search engine and a publicly available search engine.

19. The computing system of claim 14, wherein the module is further configured, when executed by the computing system, to:
 create a graph that represents links contained in each of the plurality of Web pages,
 determine which ones of the plurality of Web pages are ranked above a threshold number,
 select, using the graph, as a resulting set of potential Web pages to be recommended, one or more of the plurality of Web pages that include links to at least one of the plurality of Web pages that are ranked above the threshold number,
 order the selected resulting set of potential Web pages based on how many links to at least one of the plurality of Web pages that are ranked above the threshold number are determined to be present in each of the selected resulting set of potential Web pages, and
 provide indicators to the ordered selected resulting set of potential Web pages.

20. The computing system of claim 19, wherein the graph is stored as an intermediate data structure.

21. The computing system of claim 19, wherein the ones of the plurality of Web pages that are ranked above the threshold number are Web pages that are ranked using a ranking algorithm of one or both of a commercially available search engine and a publicly available search engine.

* * * * *